Aug. 7, 1962 J. M. ANDREWS ETAL Re. 25,220
CRACKING OF HYDROCARBONS
Original Filed May 14, 1953
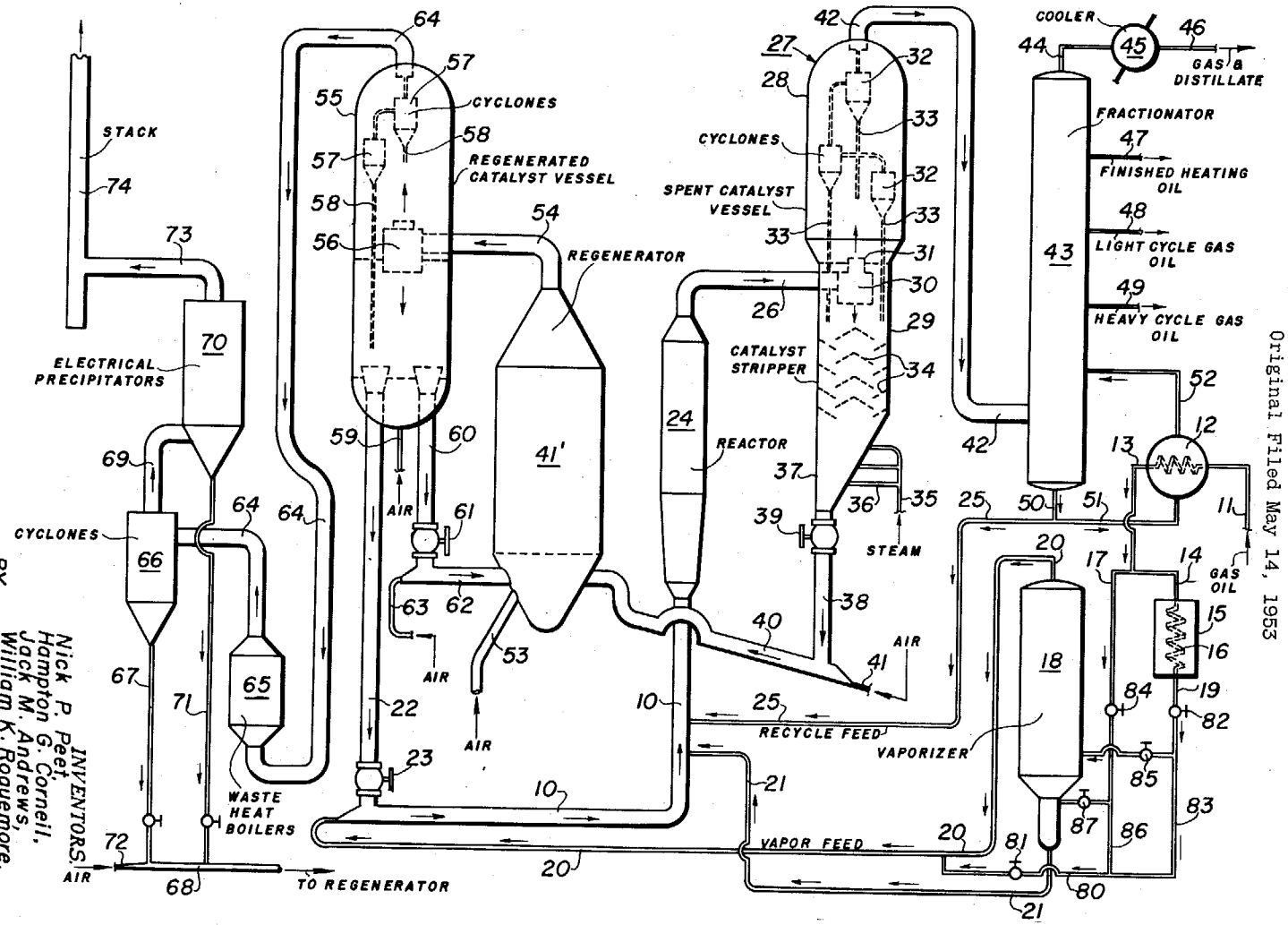
INVENTORS.
Nick P. Peet,
Hampton G. Corneil,
Jack M. Andrews,
William K. Roquemore,
BY. Henry B. McCullough
ATTORNEY.

United States Patent Office

Re. 25,220
Reissued Aug. 7, 1962

25,220

CRACKING OF HYDROCARBONS

Jack M. Andrews, Highland Park, N.J., and Hampton G. Corneil, Nick P. Peet, and William K. Roquemore, Baytown, Tex., assignors, by mesne assignments, to Esso Research and Engineering Company, Elizabeth, N.J., a corporation of Delaware Original No. 2,881,129, dated Apr. 7, 1959, Ser. No. 355,022, May 14, 1953. Application for reissue Oct. 12, 1960, Ser. No. 62,315
15 Claims. (Cl. 208—120)

Matter enclosed in heavy brackets [ ] appears in the original patent but forms no part of this reissue specification; matter printed in italics indicates the additions made by reissue.

The present invention is directed to an improved method for cracking hydrocarbons. More particularly, the invention is directed to cracking hydrocarbons in a suspension of finely divided catalyst in said vaporized hydrocarbons. In its more particular aspects, the invention is directed to cracking of hydrocarbons under contacting conditions with a finely divided catalyst which gives substantially improved and unexpected results.

The present invention may be briefly described as involving a method of cracking hydrocarbons in which a finely divided cracking catalyst is formed into a suspension in admixture with a vaporized hydrocarbon. The suspension is then flowed at a gas velocity in the range between about 8 and 50 feet per second through an elongated reaction zone having a length to diameter ratio in the range from about 4:1 to about 20:1. A sufficient amount of catalyst is maintained in suspension to provide a weight ratio of feed per hour to catalyst in the reaction zone in the range from about 20:1 to about 300:1. Under these conditions, the hydrocarbons are cracked to desirable products with formation of a minimum amount of carbonaceous material and carbon laid down on the catalyst. It is contemplated that the desirable products will be separated from the catalyst and the catalyst regenerated in a burning or combustion operation and the regenerated catalyst then employed again to form the suspension in admixture with the vaporized hydrocarbon.

The cracking reaction may take place at a temperature in the range from about 800° to about 1100° F.; a preferred range is from about 900° to about 1000° F. with quite desirable results being obtained at about 930° F.

Pressures employed in the improved cracking operation may range from about atmospheric pressure to about 50 p.s.i.g. (pounds per square inch gauge) with a preferred range of pressures from about 20 to about 35 p.s.i.g.

The improved results of the present invention are obtained by flowing the suspension through the reaction zone at a superficial gas velocity in the range between about 8 and about 50 feet per second. It is undesirable to flow the suspension at a superficial gas velocity less than about 8 feet per second and the preferred range is from 8 feet per second to about 20 feet per second. Desirable results may be obtained in the range from about 10 to about 15 feet per second.

The reaction zone employed in the present invention is an elongated reaction zone having a length to diameter ratio in the range from about 4:1 to about 20:1. Desirable results are obtained in a vertical elongated reaction zone having a length to diameter ratio of about 7:1. The reaction zone is preferably a vertical elongated reaction zone.

Also to obtain the beneficial results of the present invention, it is necessary to maintain in the reaction zone an amount of catalyst sufficient to provide a weight ratio of hydrocarbon per hour to catalyst in the reaction zone in the range from about 20:1 to about 300:1. Very good results may be obtained with a weight ratio of feed per hour to catalyst in the reaction zone in the range from about 70:1 to about 250:1.

Too, desirable results may be obtained by maintaining the catalyst rate in the operation depending on the velocity in the range of 8 to 50 feet per second in a maximum amount of 1 ton per second for the minimum velocity and a maximum amount of about 12 tons per second for the maximum velocity. At a velocity of about 20 feet per second the catalyst rate would be maintained up to about 4.5 tons per second. Thus, the catalyst loading in the reaction zone may be expressed by pounds per square foot. This may be expressed as catalyst loading in the reaction zone, and should not exceed 36 pounds per second per square foot for a gas velocity in feet per second of 8, and should not exceed 180 pounds per second per square foot for a gas velocity in feet per second of 20 or about 540 pounds per second per square foot at a gas velocity in feet per second of about 50. Employing these conditions, it is possible to obtain the beneficial results of the present invention.

The feed stock employed in the present invention is preferably a gas-oil hydrocarbon such as one obtained from crude petroleum. However, other gas-oil fractions may be used. For example, the heavy oil produced in the cracking operation or unconverted portions of the feed stock may form a component of the reaction feed. It is also contemplated that gas-oils produced from thermal cracking operations may suitably be charged to the process of the present invention. It is contemplated that residual crude pertroleum fractions may be charged as the feed stocks to the process of the present invention. The present invention may utilize as feed hydrocarbons the cracking stocks now used in either thermal or catalytic cracking of hydrocarbons and thus may encompass a wide range of feed stocks. Under some conditions, it may be desired to crack lighter fractions such as those in the heavy naphtha and kerosene boiling range, say, from about 400° to about 750° F. Solvent extracts containing large percentages of aromatic hydrocarbons may also form the feed stock to the present invention. Crude residues remaining after removal of valuable lubricating oils and other fractions may be charged to the process of the present invention.

The invention will be further illustrated by reference to the drawing in which the single figure is a flow diagram of a preferred mode of practicing the invention. Referring now to the drawing, numeral 11 designates a charge line through which a gas-oil fraction is introduced into the system from a source not shown. This gas-oil fraction passes through heat exchanger 12 wherein it picks up heat by heat exchange and is heated to a temperature of about 450° F. The heated gas-oil then is discharged from heat exchanger 12 by way of line 13 and may be split into two streams, one stream flowing by way of line 14 into a furnace 15 containing a coil wherein the temperature of the gas-oil is raised to a temperature of about 840° F. The other stream is flowed by way of line 17 into the lower portion of a vaporizer drum 18. The preheated stream from furnace 15 flows by line 19 also into vaporizer 18 at a point in the lower section of vaporizer 18 but above the point where the stream from line 17 is introduced.

The relative amounts of streams introduced by lines 17 and 19 are in the approximate ratio of about 1:6.

In vaporizer 18, conditions may approximate a temperature of 825° F. and a pressure of about 40 p.s.i. Under these conditions, there is removed from the top of vaporizer 18 by way of line 20 a vaporous fraction, and there is removed from the bottom of vaporizer 18 by line 21 a liquid fraction.

The vaporous fraction in line 20 is routed thereby i conduit 10 where it is admixed with a finely divided acking catalyst which is introduced from conduit 22, ntrolled by a valve 23. In conduit 10, the finely di- ded catalyst is formed in a suspension in the vaporous eam introduced by line 20, and the suspension is then wed into the lower end of a vertical elongated reac- n zone 24. At the entrance to the vertical elongated action zone 24, the suspension has added to it the uid stream from line 21, and downstream from the int of addition of the liquid stream there is added to suspension a liquid hydrocarbon feed introduced by e 25 from a later stage in the process, which will be scribed in more detail hereinafter.

If desired and as influenced by the volatility or other aracteristics of the feed stock, the feed stock may be passed around the vaporizer 18 through line 80 con- lled by valve 81. When operating in this manner, feed may be routed through furnace 15 by line 14 l branch line 83, valve 82 being opened and valve 84 line 17 and valves 85 and 87 being closed. Alterna- ely, the feed stock may be routed through line 17 and nch line 86 which connects into line 80 by opening ves 84 and closing valves 82 and 85, valve 87 re- ining closed. When passing a liquid feed stock through 20 the heat for vaporization of the feed stock is vided by the hot catalyst when the two are admixed line 10.

The suspension then carrying the liquid stream intro- ed by line 10 and the liquid hydrocarbon feed intro- ed by line 25 flows upwardly through reaction zone Of course, it is understood that the liquid hydrocar- streams introduced by lines 21 and 25 under the con- ons prevailing in the reaction zone 24 also become orized. Operations may be conducted in reaction zone to maintain a temperature of about 930° F., a pres- of 30 p.s.i.g., and the suspension may contain about ons of catalyst.

After passage through the elongated reaction zone 24, several hydrocarbon streams introduced therein have n substantially cracked to desirable products which contained in the suspension. This suspension con- ing the desirable products flows by way of a conduit into a catalyst vessel 27 which is provided with an er section 28, which may be termed a spent catalyst ion, and a lower section 29, which may be termed a lyst stripper section.

he suspension containing desirable products is intro- d into the vessel 27 through a distributor box 30 h is provided with a riser 31 which allows the cata- and vaporized products to discharge upwardly into on 28 and also allows the products and suspension e discharged downwardly into section 29. The upper on 28 is provided with at least a separating means h may be a plurality of cyclones 32, which are well vn to the art. These cyclones 32 may be intercon- d to allow the gases and desirable products to flow the lower of the cyclones sequentially through the nes to insure maximum seperation of the products the catalyst. The cyclones are provided with dip 33 which discharge the catalyst downwardly in the l 27 and specifically into the sections 28 and 29. catalyst separated from the desirable products flows wardly in stripper 29, which is provided with a plu- of baffle plates 34 which insures contact of the cata- with stripping steam or a stripping gas which is duced into the section 29 by line 35 through mani- 36. The steam flowing countercurrently to the de- ling catalyst removes volatilizable carbonaceous ma- from the catalyst which flows downwardly in the yst stripper section 29 and outwardly therefrom gh the cone-shaped section 37 into a conduit 38 olled by a valve 39. The conduit 38 connects into a verse conduit 40 which is provided with line 41, gh which air is introduced into conduit 40. The icks up the stripped catalyst and discharges it by way of conduit 40 into a regenerator vessel 41' where a regeneration operation takes place which will be described in more detail hereinafter.

The products from the cracking reaction substantially separated from catalyst are withdrawn from vessel 27 by way of conduit 42, which introduces the desirable products into the lower section of a fractionation zone 43, wherein the desirable products are separated and recovered. The fractionation zone may comprise a plurality of distillation towers which may be shown for convenience as a single distillation tower.

Fractionation zone 43 may operate at a top temperature of about 275° F. and a bottom temperature of about 700° F. A pressure of about 22 p.s.i.g. may be maintained on the fractionation zone 43.

Under these conditions, there may be removed from zone 43 by line 44 a fraction containing gaseous materials and the lighter fractions such as the desirable vaporous hydrocarbons having three or more carbon atoms in the molecule. For example, the stream withdrawn by line 44 may contain propane, propylene, butanes, and butylenes and the higher boiling hydrocarbons. This stream also contains the desirable cracked gasoline which may be suitably recovered. The stream in line 44 is passed through a condenser and cooler 45 and then discharged by line 46 to stablization and recovery facilities not shown. A heating oil fraction may be withdrawn from fractionation zone 43 by line 47, and light and heavy cycle gas-oil fractions may be withdrawn from zone 43 by lines 48 and 49, respectively. A heavier fraction is withdrawn from zone 43 by line 50 which connects into line 25 and forms a source for the feed hydrocarbon introduced by line 25 into zone 24. During the cracking operation in zone 24 there is laid down on the catalyst volatilizable carbonaceous material and coke. This material, if allowed to remain on the catalyst, would impair the cracking operation; however, it is desirable to have a small amount of coke or carbonaceous material on the catalyst since this allows the heat necessary for the process to be obtained at least in part by burning this material from the catalyst. It is necessary to remove this material from the catalyst to regenerate same and to allow reuse of the catalyst in the cracking operation. To this end, the air introduced into line 40 by line 41 is supplemented by air introduced into reaction zone 41' by line 53 connecting to a compressor or some other source of air. By controlling the oxygen content of the air or other free oxygen containing gas introduced into regeneration zone 41', it is possible to conduct a combustion or burning operation in regeneration zone 41' such that catalyst is substantially freed of unstrippable carbonaceous material and coke and then may be reused in the process. For example, the regenerator 41' may contain about 100 tons of catalyst which is contacted with about 47,000 standard cubic feet of air per minute causing combustion of the combustible material on the catalyst. The other conditions for maintenance for the combustion operation may be a temperature of about 1100° F. and a pressure of 11 p.s.i.g.

The regenerated catalyst in a suspension of the combustion products then flows from regeneration zone 41' by way of line 54 into a regenerated catalyst vessel 55 through a distribution box 56.

The regenerated catalyst vessel 55 is provided with separation means illustrated by cyclones 57 which may be arranged for sequential flow of the suspension therethrough to obtain maximum separation of catalyst from the combustion production, which may be termed flue gas. The cyclones 57 are provided with dip legs 58 which discharge the separated catalyst back into the vessel 55. This vessel may contain catalyst at a temperature of about 1125° F. and is of a suitable size to provide storage for about 50 tons of regenerated catalyst. Air may be introduced into the vessel 55 by line 59.

Conduit 22 withdraws the catalyst from the vessel 55 for introduction into conduit 21, as has been described, while conduit 60 controlled by valve 61 provides recycle of catalyst from vessel 55 into regenerator 41'. Conduit 60 connects into a conduit 62, into which is introduced by line 63 a sufficient amount of air to carry the catalyst from conduit 60 through conduit 62 into vessel 41'. The amount of air introduced by line 63 supplements the air introduced by lines 41 and 53.

The combustion products or flue gas from which catalyst has been separated by cyclones 57 in vessel 55 is withdrawn from vessel 55 by conduit 64, which is provided with a waste heat boiler 65 which may be a bank of tubes surrounding or arranged in the conduit 64. The waste heat boiler 65 recovers some of the heat contained in the flue gas which may be at a temperature of 1,000° F. The flue gas then flows into cyclones 66 which serve to remove catalyst fines not removed by cyclones 57 from the combustion products. These catalyst fines may have particle diameters in the range from about 0 to 20 microns. The separated catalyst fines are discharged from cyclones 66 by way of line 67 into a line 68, and the disposition of these fines will be described further hereinafter.

The flue gas substantially free of catalyst fines but containing a small amount thereof is then routed by conduit 69 into electrical precipitators 70, which may be of a conventional type where the residual amount of fines is substantially removed from the flue gas. These fines are discharged by line 71 into line 68. Air may be introduced into line 68 by line 72 in an amount sufficient to transport the fines to regenerator 41'.

A flue gas substantially free of fines is then discharged into the atmosphere by way of a conduit 73 which connects into a stack 74. It is not practical to separate completely all of the fines from the flue gas, and a minimum amount of catalyst fines may be discharged through stack 74. In fact, it may be desirable to discharge a minimum amount of catalyst fines, since discharge of a small amount and replacement thereof with fresh catalyst serves to maintain the activity of the catalyst at a high level.

By virtue of an operation as described in connection with the drawing, it is possible to achieve substantially improved and unexpected results in cracking hydrocarbons. Thus, with the present invention, it is possible to conduct a cracking operation at high efficiencies with the laying down of less coke on the catalyst than is possible in conventional operations. It is possible to produce substantially appreciated amounts of gasoline hydrocarbons without impairment of the amount of desirable butanes and butylenes.

Also in the practice of the present invention, it is possible to charge a substantially greater amount of feed stock to the system than was possible in conventional operations. Thus, in the improved process it is possible to increase the throughput by 50% while maintaining the same degree of conversion or, alternatively, the degree of conversion may be increased with the same charge rate. This is accomplished at a lower temperature with less catalyst and with less formation of coke than was obtained in conventional operations.

While the reaction zone 24, as shown in the drawing, provides for upward flow of the suspension of catalyst in hydrocarbon, the beneficial results of practicing the present invention may also be obtained when the catalyst and reactants are flowed downwardly in the reactor. To accomplish downward flow, suitable spacial rearrangement of the apparatus elements in the catalyst cycle may be required.

In a specific commercial operation, a gas-oil fraction may be divided into a vapor feed and a liquid feed and the vapor feed admixed with catalyst to form a suspension. The liquid feed is then mixed with the suspension, and the admixture has added to it a recycle feed such as one obtained from line 50 in the drawing. This suspension may then be flowed to a vertical elongated re action zone having an overall length of about 55 fee and having internal diameter for 35 feet of its lengtl of about 8 feet, which tapers for its lower 20 feet o length down to about 6 feet internal diameter. Th suspension is flowed through the reaction zone at : superficial gas velocity of about 11 feet per second, : catalyst to oil ratio of about 4.6 and a weight ratio o feed per hour per pound of catalyst in the reactor o about 77. Operating at 54% conversion on the feed a 930° F. gave substantially improved results. Thus, carbon reduction of 24% was obtained at 10% recycl of fraction such as in line 50, while charging about 51,00 barrels per day of fresh feed. These results are sub stantial improvements and allow the production of sub stantially increased amounts of valuable products ove that possible heretofore.

The catalyst employed in the practice of the presen invention may be a silica-alumina catalyst having pa ticle diameters in the range from about 0 to about 10 microns with a major amount of the catalyst havin particle diameters in the range from about 20 to abou 80 microns.

While it is preferred to use silica-alumina catalyst, th invention may be practiced with silica-magnesia catalys silica-zirconia catalyst and many other finely divide cracking catalysts known to the art.

The catalyst particles suitably may have a specific gra ity in the range of about 1.6 to about 2.73 with a pr ferred specific gravity in the range from about 1.92 t about 2.40.

The nature and objects of the present invention havin been completely described and illustrated, what we wis to claim as new and useful and secure by Letters Pate is:

1. A method of cracking hydrocarbons which con prises forming a suspension of a finely divided crackin catalyst having a specific gravity in the range betwee about 1.6 and about 2.73 in a vaporized hydrocarbo feed at a temperature in the range between 800° an 1100° F., flowing said suspension at said temperatu at a gas velocity in the range between about 8 and abo 50 feet per second through said vertical elongated reactio zone having a length to diameter ratio in the range fro about 4 to 1 to about 20 to 1, maintaining a sufficie amount of catalyst in said suspension to provide in sa reaction zone a weight ratio of feed per hour to cataly in the range from about 20 to 1 to about 300 to 1 t crack said hydrocarbon feed to desirable products, ar recovering said products.

2. A method of cracking hydrocarbons which con prises forming a suspension of a finely divided crackir catalyst having a specific gravity in the range betwee about 1.6 and about 2.73 in a vaporized hydrocarbc feed at a temperature in the range between 800° ar 1100° F., one of the components of said suspension ha ing its direction of flow changed immediately prior being formed into said suspension, flowing said suspe sion at said temperature at a gas velocity in the ran between about 8 and about 50 feet per second throu a vertical elongated reaction zone having a length diameter ratio in the range from about 4 to 1 to abo 20 to 1, maintaining a sufficient amount of catalyst said suspension to provide in said reaction zone a weig ratio of feed per hour to catalyst in the range from abo 20 to 1 to about 300 to 1 to crack said hydrocarbon fe to desirable products and to lay down on said cataly carbonaceous material and coke, separating catalyst co taining carbonaceous material and coke from said d sirable products, recovering said products, admixing sa separated catalyst containing carbonaceous material a coke with a free oxygen-containing gas in an amount su ficient to support a combustion operation and to form suspension of said catalyst containing coke and c bonaceous material, burning carbonaceous material a ke from said catalyst in said suspension of said finely ıided catalyst in said free oxygen-containing gas to renerate same, and separating combustion reaction prodts from said regenerated catalyst.

3. A method of cracking hydrocarbons which comses introducing a liquid hydrocarbon feed into a stream hot, finely divided cracking catalyst having a specific ıvity in the range from about 1.6 to about 2.73, vaporng said liquid hydrocarbon feed to form a suspension said finely divided catalyst in vapors of said hydro-bon feed at a temperature in the range between 800° d 1100° F., one of the components of said suspension ving its direction of flow changed immediately prior being formed into said suspension, flowing said susısion at said temperature at a gas velocity in the range ween about 8 and about 50 feet per second through vertical, elongated reaction zone having a length to meter ratio in the range from about 4:1 to about 20:1, intaining a sufficient amount of catalyst in said susısion to provide in said reaction zone a weight ratio feed per hour to catalyst in the range from about 20:1 about 300:1 to crack said hydrocarbon feed to desire products and to lay down on said catalyst carıaceous material and coke, separating catalyst contain- carbonaceous material and coke from said desirable ıducts, recovering said products, admixing said sepaed catalyst containing carbonaceous material and coke h a free oxygen-containing gas in an amount suffent to support a combustion operation and to form a pension of said catalyst containing coke and carıaceous material, burning said carbonaceous material l coke from said catalyst in said suspension of said ly divided catalyst in said free oxygen-containing gas regenerate same and separating combustion reaction ducts from said regenerated catalyst.

. A method of cracking hydrocarbons boiling in the ge from 400° to 750° F. which comprises vaporizing l hydrocarbons, forming a suspension of a finely ided silica-alumina cracking catalyst having a specific vity in the range between about 1.6 and about 2.73 in l vaporized hydrocarbons at a temperature in the range ween 800° and 1100° F., one of the components of l suspension having its direction of flow changed imliately prior to being formed into said suspension, ing to said suspension a liquid stream of hydrocarbons ained from a later stage in the process, flowing said pension at a temperature in the range between 800° 1100° F. at a gas velocity in the range between about nd about 50 feet per second through a vertical elon-d reaction one having a length to diameter ratio of ut 4 to 1 to about 20 to 1, maintaining a sufficient ount of said catalyst in said suspension to provide in reaction one a weight ratio of feed per hour of lyst in the range from about 20 to 1 to about 300 to crack said hydrocarbon to desirable products, sepang said desirable products from said catalyst, and vering from said products desirable hydrocarbons and liquid stream of hydrocarbons which is admixed said suspension.

. A method in accordance with claim 4 in which the ly divided silica-alumina catalyst has particle diams in the range from about 0 to about 100 microns.

. A process for cracking a gas-oil which comprises ting said gas-oil to a temperature in the range from ut 400° to about 900° F., separating said gas-oil into ıajor quantity of a vaporous fraction and a minor ntity of a liquid fraction, admixing a finely divided a-alumina catalyst having a specific gravity in the ge between about 1.6 and about 2.73 in said vaporous tion to form a suspension, admixing said liquid frac- with said suspension and adding to said suspension nstream from the addition of said liquid fraction a id hydrocarbon feed obtained from a later stage of process, one of the components of said suspension ing its direction of flow changed immediately prior to being formed into said suspension, flowing said suspension containing said liquid fraction and said liquid hydrocarbon at a temperature in the range between 800° and 1100° F. at a gas velocity in the range between about 8 and about 50 feet per second through a vertical elongated reaction zone having a length to diameter ratio in the range from about 4 to 1 to about 20 to 1, maintaining a sufficient amount of catalyst in said suspension to provide in said reaction zone a weight ratio of feed per hour to catalyst in the range from about 20 to 1 to about 300 to 1 to crack said gas-oil to desirable products, separating said desirable products from said catalyst, recovering at least a first fraction from said desirable products and at least said liquid hydrocarbon feed which is admixed with said suspension, and regenerating the catalyst separated from said desirable products.

7. A process for cracking a gas-oil which comprises heating said gas-oil to a temperature in the range from about 400° to about 900° F., separating said gas-oil into a major quantity of a vaporous fraction and a minor quantity of a liquid fraction, admixing a finely divided silica-alumina catalyst having particle diameters in the range from about 0 to 100 microns and having a specific gravity in the range between about 1.6 and about 2.73 in said vaporous fraction to form a suspension admixing said liquid fraction with said suspension and adding to said suspension downstream from the addition of said liquid fraction a liquid hydrocarbon feed obtained from a later stage of the process, one of the components of said suspension having its direction of flow changed immediately prior to being formed into said suspension, flowing said suspension containing said liquid fraction and said liquid hydrocarbon at a temperature in the range between 800° and 1100° F. at a gas velocity in the range between about 8 and about 20 feet per second through a vertical elongated reaction zone having a length to diameter ratio in the range from about 4 to 1 to about 20 to 1, maintaining a sufficient amount of catalyst in said suspension to provide in said reaction zone a weight ratio of feed per hour to catalyst in the range from about 20 to 1 to about 300 to 1 to crack said gas-oil to desirable products, separating said desirable products from said catalyst, recovering at least a first fraction from said desirable products and at least said liquid hydrocarbon feed which is admixed with said suspension, regenerating the catalyst separated from said desirable products, and admixing said regenerated catalyst with the vaporous fraction to form said suspension.

8. A method of reaction hydrocarbons which comprises forming a suspension of a finely divided catalyst having a specific gravity in the range between about 1.6 and about 2.73 in a vaporized hydrocarbon feed at a temperature in the range between 800° and 1100° F., one of the components of said suspension having its direction of flow changed immediately prior to being formed into said supension, flowing said suspension at said temperature at a gas velocity in the range between about 8 and about 50 feet per second through a vertical elongated reaction zone having a length to diameter ratio in the range from about 4 to 1 to about 20 to 1, maintaining a sufficient amount of catalyst in said suspension to provide in said reaction zone a weight ratio of feed per hour to catalyst in the range from about 20 to 1 to about 300 to 1 to react said hydrocarbon feed to form desirable products, and recovering said products.

9. A method of cracking hydrocarbons which comprises forming a suspension of a finely divided cracking catalyst having a specific gravity in the range between about 1.6 and about 2.73 in a vaporized hydrocarbon feed at a temperature in the range between 800° and 1100° F., one of the components of said suspension having its direction of flow changed immediately prior to being formed into said suspension, flowing said suspension downwardly at said temperature at a gas velocity in the range between about 8 and about 50 feet per second through a vertical elongated reaction zone having a length to diameter ratio in the range from about 4 to 1 to about 20 to 1, maintaining a sufficient amount of catalyst in said suspension to provide in said reaction zone a weight ratio of feed per hour to catalyst in the range from about 20 to 1 to about 300 to 1 to crack said hydrocarbon feed to desirable products, and recovering said products.

10. A method in accordance with claim 1 in which the direction of flow of the hydrocarbon is changed.

11. A method in accordance with claim 1 in which the direction of flow of the finely divided catalyst is changed.

12. A method in accordance with claim 1 in which the specific gravity is in the range between about 1.92 and about 2.40, the gas velocity is in the range betwen about 8 feed and about 20 feet per second, the length to diameter ratio is about 7 to 1 and the weight ratio of feed per hour to catalyst is in the range from about 70 to 1 to about 250 to 1.

13. A method in accordance with claim 1 in which the length to diameter ratio is about 7 to 1.

*14. In the invention defined in claim 1, the further in provement which comprises introducing a separate liqu hydrocarbon feed into the suspension of vaporized hydr carbon feed and finely divided cracking catalyst.*

*15. In the invention defined in claim 1, the further in provement which comprises introducing a liquid cycle c fraction obtained from the cracked products into the su pension of vaporized hydrocarbon feed and finely divide cracking catalyst.*

References Cited in the file of this patent or the original patent

UNITED STATES PATENTS

| | | |
|---|---|---|
| 2,312,230 | Belchetz | Feb. 23, 19 |
| 2,351,793 | Voorhees | June 20, 19 |
| 2,374,073 | Belchetz | Apr. 17, 19 |
| 2,378,542 | Edmister | June 19, 19 |
| 2,396,109 | Martin | Mar. 5, 19 |
| 2,427,341 | Alther | Sept. 16, 19 |
| 2,487,065 | Milliken | Nov. 8, 19 |
| 2,766,184 | Blanding | Oct. 9, 19 |